(12) United States Patent  (10) Patent No.: US 9,366,834 B2
Oki et al.  (45) Date of Patent: Jun. 14, 2016

(54) PLUGGABLE OPTICAL TRANSCEIVER

(71) Applicant: Sumitomo Electric Industries, Ltd., Osaka-shi (JP)

(72) Inventors: Kazushige Oki, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/923,163

(22) Filed: Oct. 26, 2015

(65) Prior Publication Data

US 2016/0116693 A1  Apr. 28, 2016

(30) Foreign Application Priority Data

Oct. 27, 2014 (JP) ................................. 2014-218265

(51) Int. Cl.
*G02B 6/36* (2006.01)
*G02B 6/42* (2006.01)

(52) U.S. Cl.
CPC .................................. *G02B 6/4261* (2013.01)

(58) Field of Classification Search
CPC ..................................................... G02B 6/4261
See application file for complete search history.

(56) References Cited

U.S. PATENT DOCUMENTS

| 7,470,139 | B2 * | 12/2008 | Miki | ......................... | H04B 1/38 |
| | | | | | 439/354 |
| 8,098,493 | B2 | 1/2012 | Ice | | |

\* cited by examiner

*Primary Examiner* — Uyen Chau N Le
*Assistant Examiner* — Chad Smith
(74) *Attorney, Agent, or Firm* — Venable LLP; Michael A. Sartori; Laura G. Remus

(57) ABSTRACT

A pluggable optical transceiver, which is to be engaged with a rail prepared in the host system, is disclosed. The optical transceiver includes a housing that encloses optical and electrical components therein, a fastening screw that screws that engages the optical transceiver with the rail, and an actuator, which moves synchronously with the rotation of the fastening screw, protrudes from the side of the housing to be latched with the rail.

9 Claims, 16 Drawing Sheets

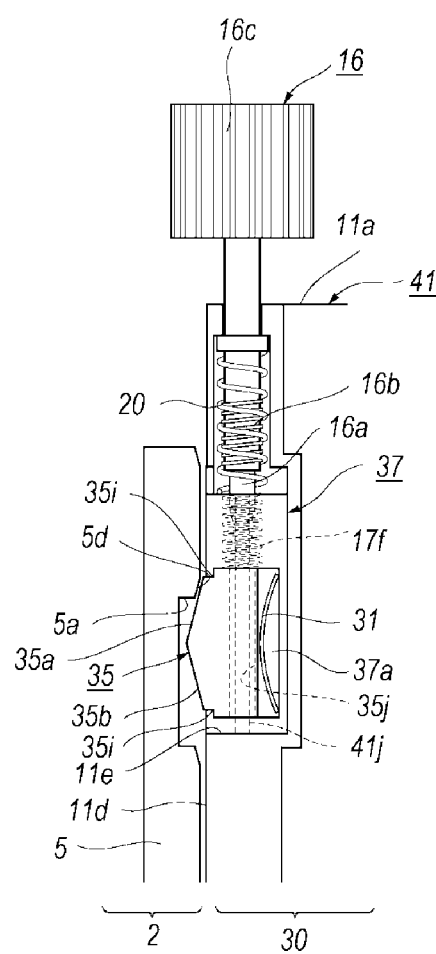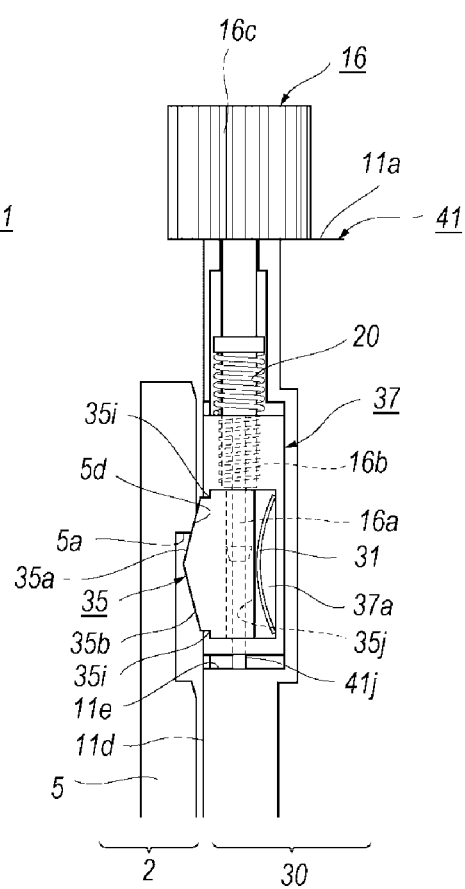

PLUGGABLE OPTICAL TRANSCEIVER

BACKGROUND OF THE INVENTION

1. Field of the Invention

The present application relates to a pluggable optical transceiver, in particular, the application relates to an optical transceiver with a type of the CFP transceiver.

2. Background Arts

One of multi-source agreements (MSAs) of an optical transceiver called as a centum (100) gigabit Form-factor pluggable (CFP) has defined electrical interfaces to a host system and outer dimensions thereof. The CFP optical transceiver defined therein includes top and bottom housings, two fastening screws, and a front panel. Two fastening screws, which are provided in respective sides of the front panel, each extend from the front panel to the rear end of the housing. Fastening these screws to holes provided in the host system, the CFP optical transceiver securely engages with the host system.

Two screws in the sides thereof restricts an inner space of the housing, where optical and electrical components are installed. The MSA regarding the CSP transceiver further defines specifications in a range of 400 Gbps. Optical components applicable to 400 Gbps will become large in outer sizes thereof and electrical components operable thereat inherently show greater power dissipation. Accordingly, the housing of a CFP transceiver becomes further preferable in the inner space thereof as wider as possible.

SUMMARY OF THE INVENTION

An aspect of the present application relates to a pluggable optical transceiver that is to be engaged with a rail prepared in the host system. The optical transceiver of the embodiment provides a housing that encloses optical and electrical components therein and has a front panel, a fastening screw that passes through the front panel of the housing and engages pluggable the optical transceiver with the rail, and an actuator that protrudes from a side of the housing extending perpendicular to the front panel of the housing. A feature of the present pluggable optical transceiver is that the actuator is to be latched with the rail of the host system synchronously with the motion of the fastening screw.

BRIEF DESCRIPTION OF THE DRAWINGS

The foregoing and other purposes, aspects and advantages will be better understood from the following detailed description of a preferred embodiment of the invention with reference to the drawings, in which:

FIG. 10A shows a condition before the engagement and FIG. 10B shows another condition after the engagement;

FIGS. 13A and 13B show a mechanism of the second embodiment to engage the CFP transceiver with the host system, where FIG. 13A shows a status before the engagement and FIG. 13B shows another status after the engagement;

FIG. 16A shows a status before the engagement and FIG. 16B shows another condition after the engagement.

DESCRIPTION OF EMBODIMENTS

Next, some embodiments of an optical transceiver according to the present invention will be described as referring to drawings. In the description of the drawings, numerals or symbols same with or similar to each other will refer to the elements same with or similar to each other without duplicating explanations.

First Embodiment

Figure 1:
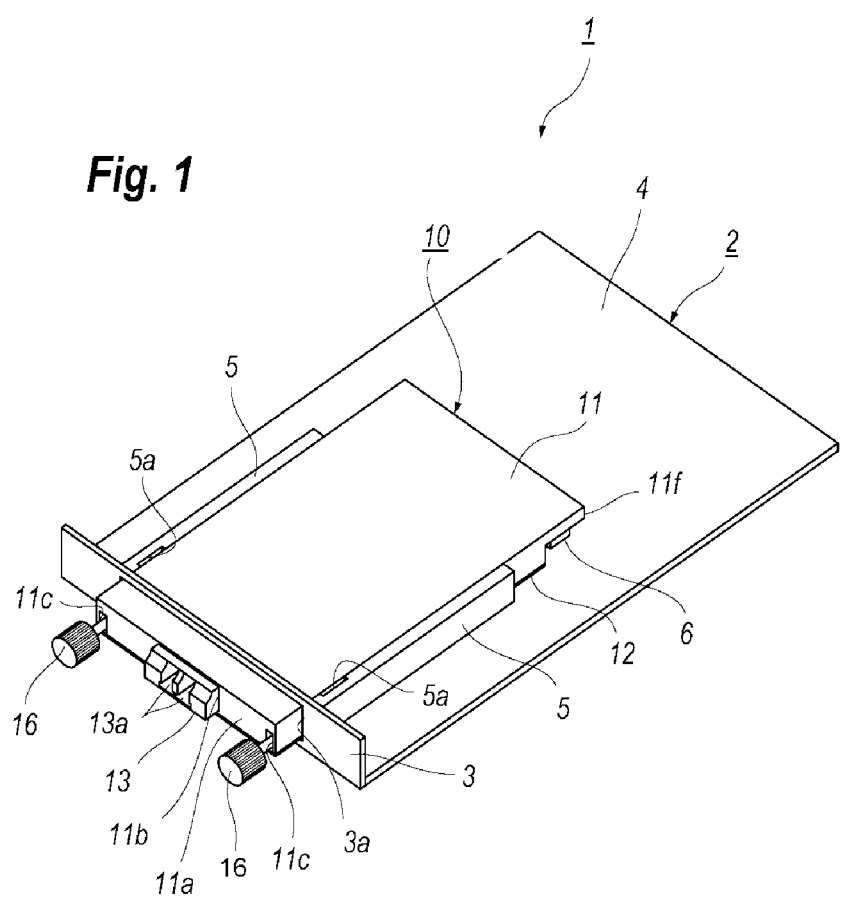
FIG. 1 is a perspective view of a CFP optical transceiver mounted on a host board.
Figure 2:
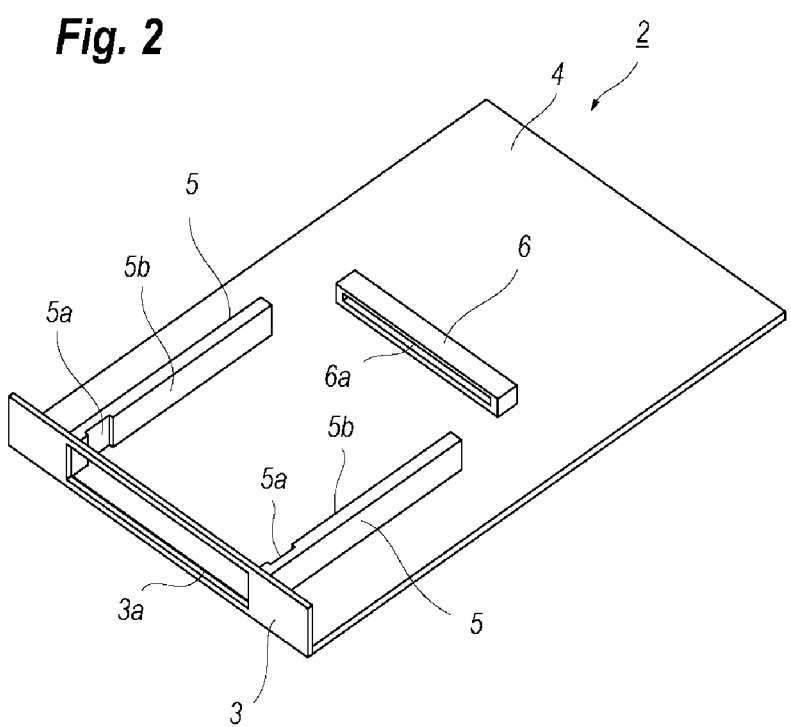
FIG. 2 is a perspective view of the host board.
Figure 3:
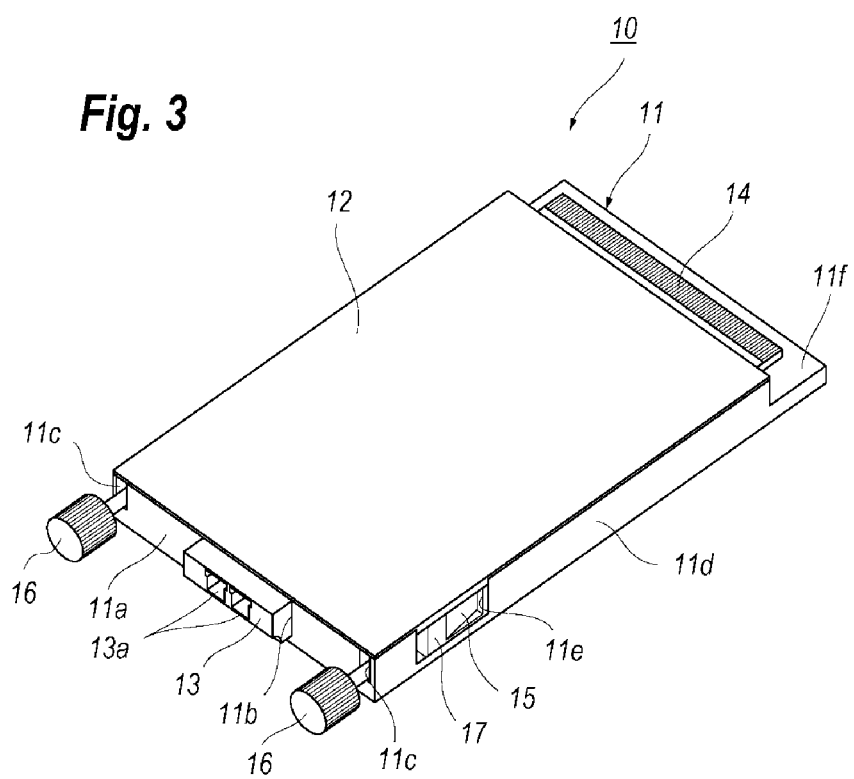
FIG. 3 is a perspective view of the CFP transceiver according to the first embodiment of the present application.

FIG. 1 is a perspective view showing a transceiver system where an optical transceiver is set on a host system 2. The transceiver system 1 includes a host system 2 and a pluggable optical transceiver 10 of a type of CFP (Centum gigabit Form Factor Pluggable), which follows one of MSAs (multi-source agreements) concerning to optical transceivers; FIG. 2 is a perspective view showing only the host system 2; and FIG. 3 is also a perspective view showing only the optical transceiver 10.

Referring to FIG. 2, the host system 2 includes a front panel 3, a circuit board 4, two rails 5, and a host connector 6. Referring to FIG. 3, the optical transceiver 10 includes a top housing 11, a bottom housing 12, an optical receptacle 13, an electrical plug 14, actuators 15, fastening screws 16, holders 17, a circuit board 19, and coil springs 20, where the actuators 15, the holders 17, the fastening screws 16, and the coil springs 20 are provided in respective sides of the optical transceiver 10.

The description below assumes that "front" or "forward" is a direction where the optical receptacle 13 is provided, while, "rear" or "back" is a side where the electrical plug 14 is provided. However, these directions are only for the explanation sake and could not narrower the scope of the present invention.

The front panel 3 of the host system 2 provides a rectangular opening 3a in a center thereof, through which the optical transceiver 10 is set on the host system 2. Although not shown in figures, the front panel 3 may provide a cover surrounding the front opening 3a, which is admitted in the MSA. The circuit board 4 mounts two rails 5 that extend rearward from respective sides of the front opening 3a to guide the optical transceiver 10 set through the front opening 3a. The rails 5 provide hollows 5a in respective inner walls facing to each other of the front portion thereof.

The host connector 6 is provided in a rear of the rails 5 on the circuit board 4 so as to face the front opening 3a. The host connector 6 provides, in a front thereof, a receptacle 6a into which the electrical plug 14 of the optical transceiver 10 is plugged. The optical transceiver 10 set through the front opening 3a slides rearward as maintaining the horizontal level thereof by being guided by the rails 5 and inserts the electrical plug 14 in the rear of the housing into the receptacle 6a of the host connector 6.

Figure 4:
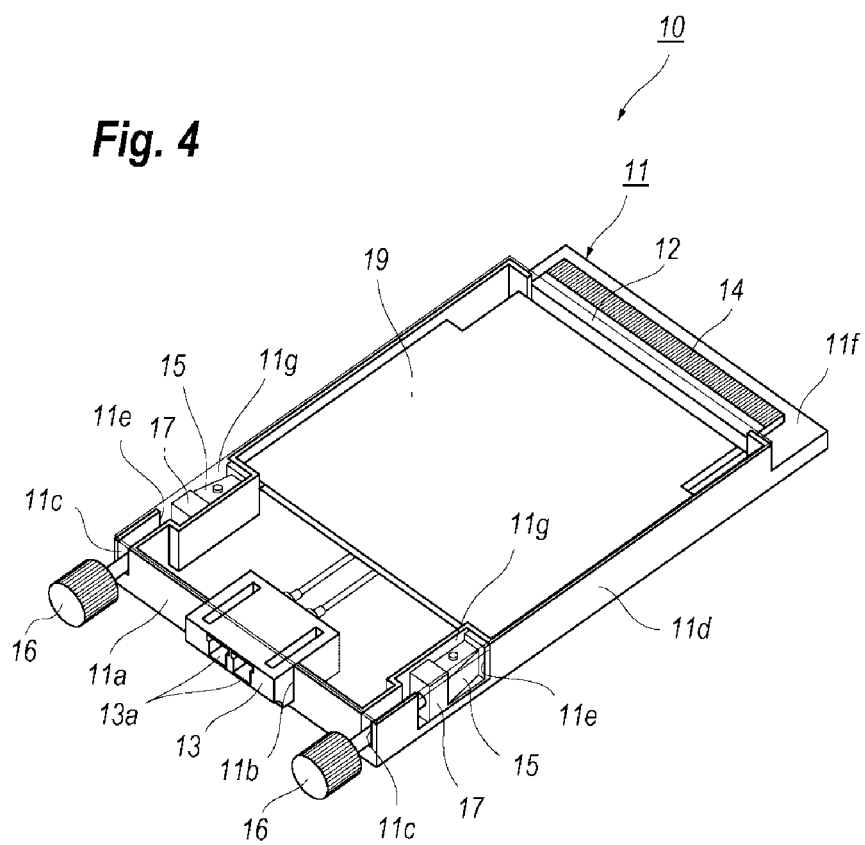
FIG. 4 shows an inner space of the CFP transceiver.

FIG. 4 is a perspective view of an inside of the top housing 11 by removing the bottom housing 12. Note that FIG. 4 is drawn in upside down. The optical transceiver 10 has the bilateral symmetry along the longitudinal axis thereof. The top housing 11, which has a box shape, provides a lid and the sides. A front wall 11a thereof provides guides 11c in respective sides to guide the fastening screws 16 therethrough. Although not shown in FIG. 4, the bottom housing 12 shows a function of a cover to form a space accompanied with the top housing 11. The front wall 11a also provides a square opening 11b through which an optical receptacle 13 exposes.

Specifically, a front of the optical receptacle 13 exposed from the front wall 11a provides two optical ports 13a arranged in side by side. Two optical ports 13 receive an external optical connector to optically couple the optical transceiver 10 with external fibers. The top housing 11 also provides eaves 11f in the rear end thereof that covers an electrical plug 14.

Respective side walls 11d of the top housing 11 provide windows 11e through which the actuators 15 and the holders 17 expose. The window 11e faces the hollow 5a of the rail 5 in the host system 2 when the optical transceiver 10 is set within the opening 3a of the front panel 3. The window 11e continues with the guide 11c into which the fastening screw 16 is inserted. The side wall 11d further provides the pocket 11g depressed inward from the window 11e and continuous to the guide 11c. The pocket 11g extends from the guide 11c to the rear end of the window 11e.

Figure 5:
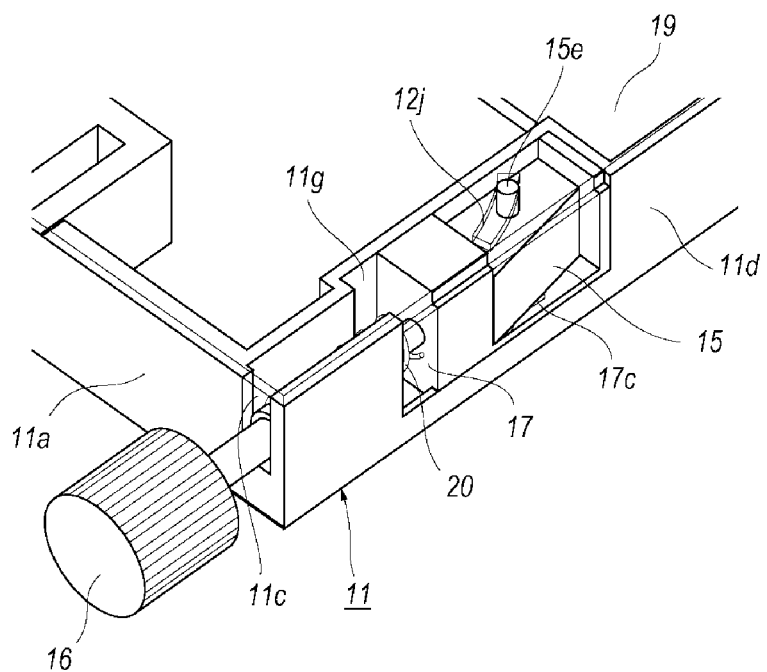
FIG. 5 magnifies a screw, a latch, and a holder implemented in the CFP transceiver shown in FIG. 4.

FIG. 5 magnifies the screw 16, the actuator 15, and the holder 17 implemented in the CFP transceiver shown in FIG. 4. As illustrated in FIGS. 4 and 5, the pocket 11g of the top housing 11 receives the actuator 15, the screw 16, and the holder 17 therein. The actuator 15 and the holder 17 are longitudinally movable within the pocket 11g such that the actuator 15 protrudes and/or retreat the side 11d of the top housing 11 synchronous with the longitudinal move thereof.

The pocket 11g is formed closer to the front of the top housing 11, which means that the actuator 15 and the holder 17 are also provided in the front; accordingly, the pocket 11g, the actuator 15, and the holder 17 may leave a space in the rear of the housing. The present embodiment sets the circuit board 19, which mounts circuits to control the operation of the optical transceiver 10 and process RF signals transmitted/received by the optical transceiver 10, and optical modules to transmit/receive optical signals in the rear in the housing. The circuit board 19 provides an optical receptacle 13 in a front edge thereof, and an electrical plug 14 in the rear end.

Figure 6:
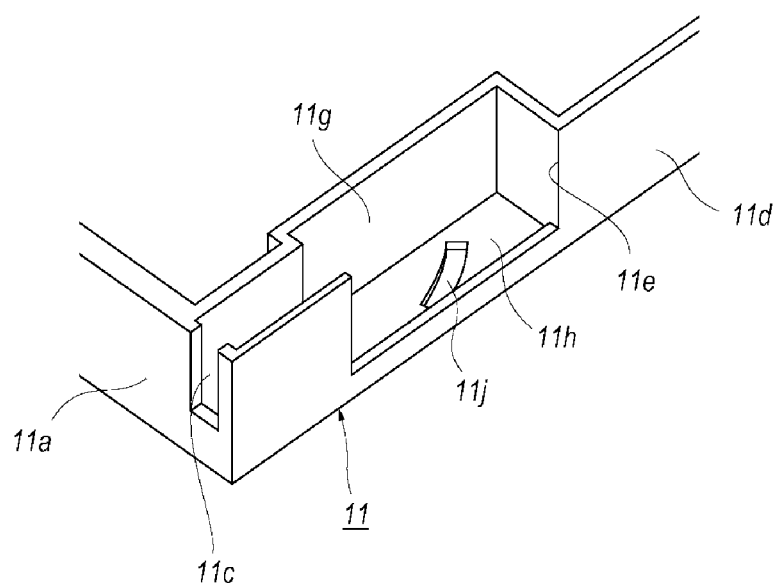
FIG. 6 illustrates only the pocket 11g by removing the actuator 15 and the screw.

FIG. 6 illustrates only the pocket 11g by removing the actuator 15, the screw 16, and the holder 17. The pocket 11g, which is exposed from the window 11e, provides a bottom 11h with a groove 11j. The groove 11j has an arched plane shape extending outward as heading forward. Referring to FIG. 5, the bottom housing 12 also provides an arched groove 12j making a pair with respect to the former groove 11j in the top housing 11.

Figure 7:
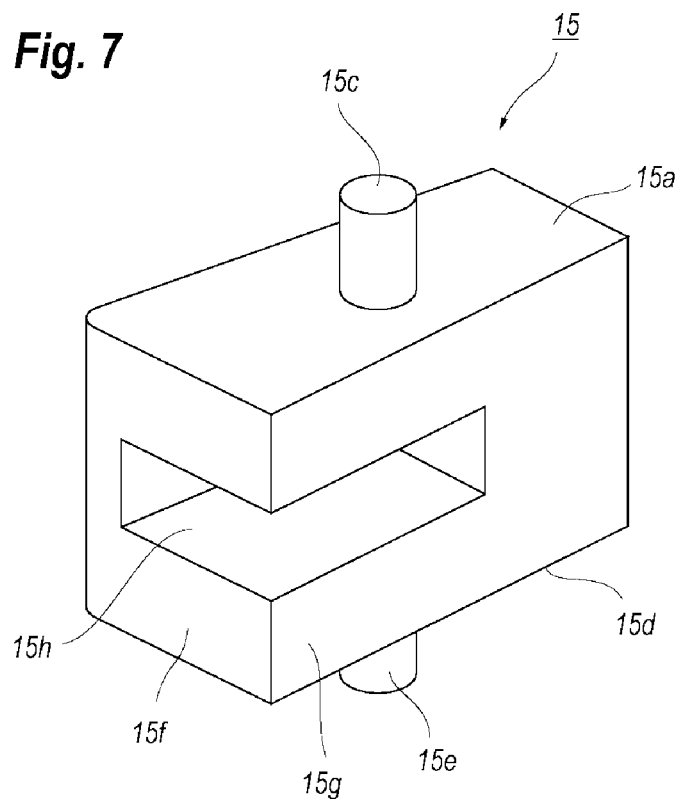
FIG. 7 is a perspective view of the actuator.

FIG. 7 is a perspective view of the actuator 15. The actuator 15 provides a cylindrical projection 15c protruding upward from a top surface 15a of the actuator, and another cylindrical projection 15e protruding from a bottom surface 15d of the actuator 15. Two projections have a common axis, around which the actuator 15 may rotate. The actuator 15 further provides a front surface 15f and a side surface 15g continuous to the front 15f, where both surfaces, 15f and 15g, provides a cut 15h penetrating from a corner between two surfaces, 15f and 15g, and having a rectangular plane shape. The actuator 15 has a trapezoidal plane shape.

The upper cylindrical projection 15c is set within the arched groove 11j of the top housing 11, while, the lower cylindrical projection 15e is set within the groove 12j of the bottom housing 12. Setting the cylindrical projections, 15c and 15e, in respective grooves, 11j and 12j, the actuator 15 becomes movable along the arched grooves, 11j and 12j. The cut 15h is provided for receiving the fastening screw 16 inserted from the front. That is, the fastening screw 16 is not tightly in contact with the actuator 15.

Figure 8:
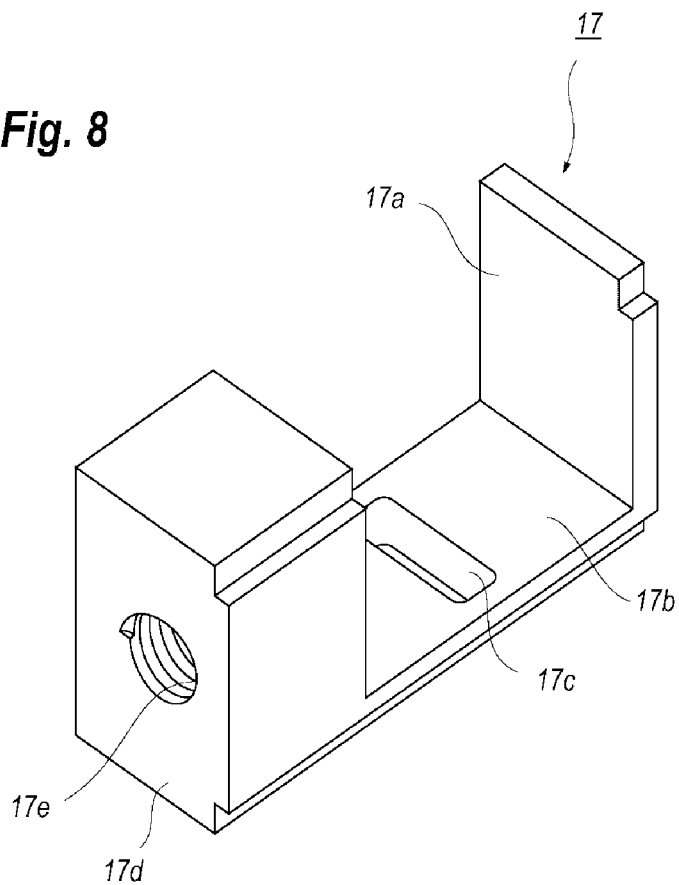
FIG. 8 is a perspective view of a holder.

FIG. 8 is a perspective view of the holder 17. The holder 17, which has a rectangular outer shape, provides a pocket 17a behind the front wall 17d to receive the actuator 15 therein. The front wall 17d provides a screw hole 17e. The bottom 17b provides a guide 17c extending along the lateral direction of the optical transceiver 10. The guide 17c receives the cylindrical projection 15c in the bottom surface thereof. Inserting the cylindrical projection 15c into the guide 17c, the actuator 15 may be laterally movable. The screw hole 17e is to be engaged with a thread of the fastening screw 16 therein.

Figure 9:
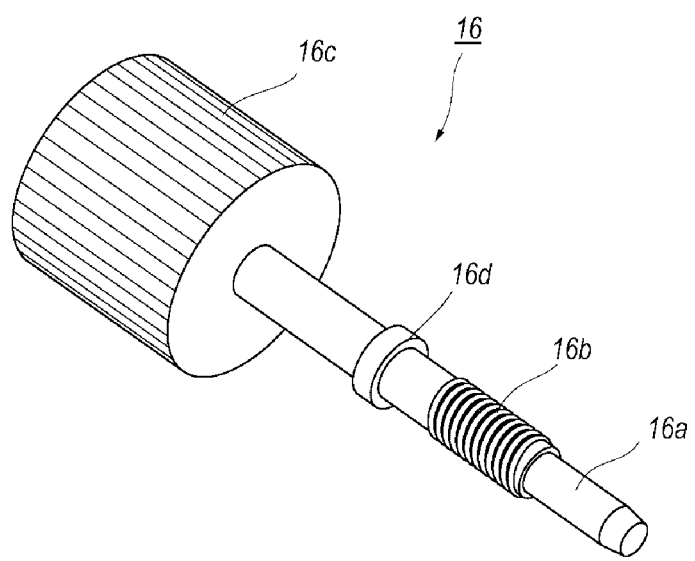
FIG. 9 is a perspective view of a screw.

FIG. 9 is a perspective view of the fastening screw. The fastening screw 16 provides an end 16a, a thread 16b formed in a center thereof and engaged with the screw hole 17e of the holder 17, a knob 16c in the front end thereof, and a flange 16d between the knob 16c and the thread 16b. The end 16a, which is inserted into the screw hole 17e of the holder 17 from the front but not engaged therewith. The knob 16c has a diameter greater than a diameter of the end 16a.

Figure 10A:
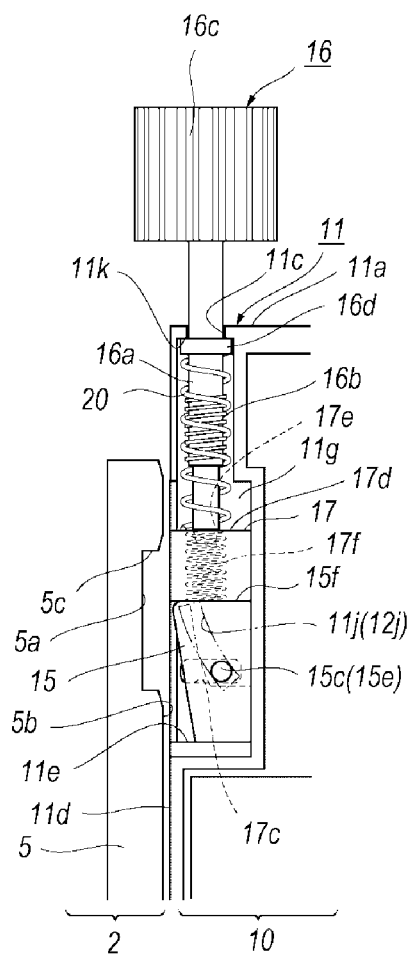
FIGS. 10A and 10B explain a mechanism of the first embodiment to engage the optical transceiver with the host system by the screw, where
Figure 10B:
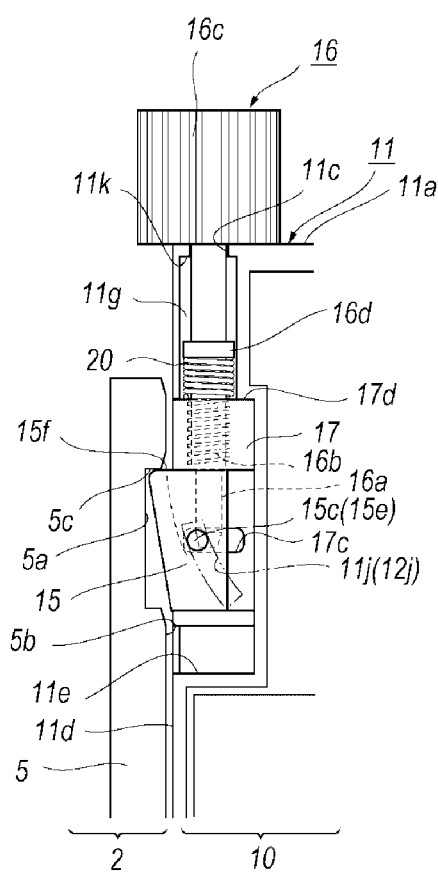

FIGS. 10A and 10B explain a mechanism, according to the first embodiment of the present application, to engage the optical transceiver 10 with the host system 2 by the screw 16. FIG. 10A shows a status before the engagement and FIG. 10B shows another status after the engagement. As shown in FIGS. 10A and 10B, the mechanism provides a coil spring 20 between the holder 17 and the flange 16d of the fastening screw 16, where the coil spring 20 pushes the flange 16d of the fastening screw 16 forward and the holder 17 rearward. That is, the coil spring 20 is set between the front wall 17d of the holder 17 and the flange 16d of the fastening screw 16 in the pocket 11g of the top housing 11. When the actuator 15 is released from the rail 5 of the host system, the coil spring 20 pushes the knob 16c frontward so as to abut the flange 16d against the front stopper 11k of the top housing 11, which is the initial position.

A process to assembly the actuator 15, the fastening screw 16, the holder 17, and the coil spring 20 will be described. As shown in FIG. 10A, the fastening screw 16, which is assembled with the coil spring 20, is set within the guide 11c as the flange 16d abuts against the front stopper 11k; that is, the coil spring 20 is set behind the front stopper 11k. Then, the holder 17 is set within the pocket 11g of the top housing such that the screw hole 17e of the holder receives the tip end 16a of the fastening screw 16, and the actuator 15 is set within the pocket 17a of the holder 17 such that the front surface 15f turns forward and the top cylindrical projection 15c is set within the guide 17c of the bottom 17b of the holder 17. In an alternative, the actuator 15 is first set within the holder 17;

then the holder 17 is set within in the pocket 11g of the top housing 11. Finally, the bottom housing 12 is assembled with the top housing 11 such that the groove 12j in the bottom housing 12 receives the bottom cylindrical projection 15e of the actuator 15.

Next, a mechanism to secure the optical transceiver 10 within the host system 2 by using the actuator 15, the fastening screw 16, the holder 17, and the coil spring 20, will be described. In a condition where the optical transceiver 10 is free from the host system 2, which is the initial position, the flange 16d of the fastening screw 16 abuts against the front stopper 11k of the guide 11c, and the top cylindrical projection 15c positions in the rear end of the grooves, 11j and 12j, of the top and bottom housings, 11 and 12, and the innermost end of the guide 17c of the holder 15, which is illustrated in FIG. 10A.

Pushing the fastening screw 16 inward and rotating the knob 16c so as to engage the thread 16b with the screw hole 17e, the fastening screw 16 catches the holder 17. Rotating the knob 16c further, the holder 17 moves forward by the engagement of the thread 16b with the screw hole 17e. The forward movement of the holder 17 also moves the actuator 15 forward. Because the grooves, 11j and 12j, of the housing diagonally extend with respect to the longitudinal axis of the housing, the actuator 15, sliding along the grooves, 11j and 12j, protrudes from the side 11d of the top housing 11. Then, the protruded portion of the actuator 15 is to be set within the hollow 5a of the rail 5 in the host system 2 and the front surface 15f of the actuator 15 is in contact to the rear front surface 5c of the hollow 5a, as shown in FIG. 10B.

This butting of the actuator 15 against the front wall 5c engages the actuator 15 with the rail 5 to prohibit the optical transceiver 10 from slipping out from the host system 2. Further rotating the knob 16c, the optical transceiver 10 is pushed rearward to engage the electrical plug 14 provided in the rear end of the optical transceiver 10 with the host connector 6. Thus, the optical transceiver 10 is secured in the host system 2.

Rotating the knob 16c reversely, the engagement of the optical transceiver 10 with the host system 2 may be released. Specifically, the reverse rotation of the knob 16c moves the fastening screw 16 frontward and the holder 17 rearward by the mechanism between the thread 16b and the screw hole 17e, which also slides the actuator 15 within the grooves, 11j and 12j. That is, the slide of the actuator 15 along the grooves, 11j and 12j, accompanies with the diagonal and rearward movement thereof, which puts the front surface 15f, which protrudes from the side 11d of the top housing 11, inward within the pocket 11g. Further rotating the knob 16c reversely, the fastening screw 16 further slide forward and the holder 17 slides rearward to release the engagement of the thread 16b with the screw hole 17e, and the coil spring 20 pushes the knob 16 frontward to set the fastening screw 16 in the initial position. Popping out of the fastening screw 16 may easily indicate that the fastening screw 16 is in the initial position.

In the optical transceiver 10, the actuator 15 and the fastening screw 16 are set within the pocket 11g provided in the front side of the of the top housing 11, which means that the fastening screw 16 is terminated in a midway in the side of the top housing 11. Accordingly, the housing of the present optical transceiver 10 may widen an inner space for mounting electrical and optical components therein by a space where the fastening screw exits in a conventional arrangement. The fastening screw in the conventional arrangement extends to the rear end of the top housing and protrudes from the rear end to be fastened with the host connector.

Also, the optical transceiver 10 following the standard of the CFP MSA must provide the number of the electrical terminals, exactly, 148 electrical terminals in the electrical plug 14, which means that greater pressure is inevitable to mate the electrical plug 14 with the host connector 6. The mechanism of the present embodiment, the engagement of the electrical plug 14 with the host connector 6 may be performed by rotating the knob 16c, which makes the engagement and disengagement therebetween drastically easy.

Second Embodiment

Figure 11:
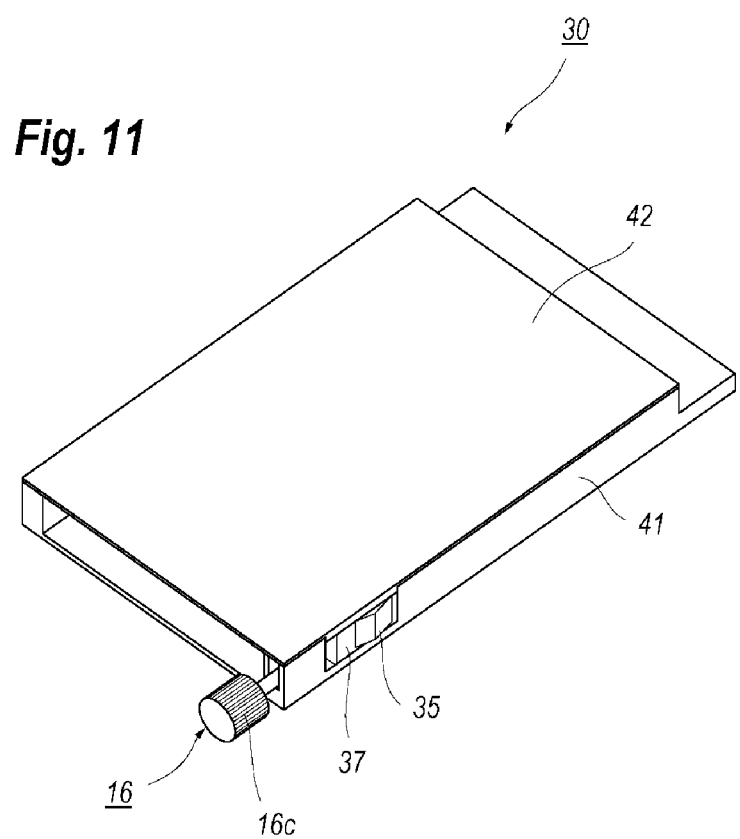
FIG. 11 is a perspective view of a CFP transceiver according to the second embodiment of the present application.
Figure 12:
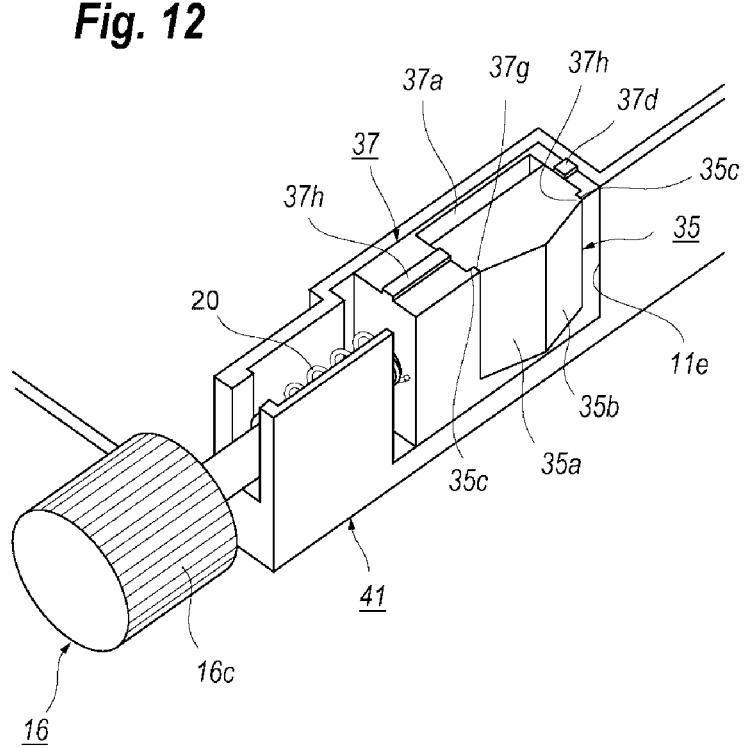
FIG. 12 magnifies the screw, the actuator, and the holder of the second embodiment.

Next, an optical transceiver according to another embodiment of the present application will be described as referring to FIGS. 11 to 13B, where FIG. 11 is a perspective view of a CFP transceiver, FIG. 12 magnifies the screw, the actuator, and the holder of the second embodiment, and FIGS. 13A and 13B show a mechanism to engage the CFP transceiver with the host system. The optical transceiver 30 of the present embodiment provides a leaf spring 31, an actuator 35, a holder 37, a top housing 41, and a bottom housing 42, where FIG. 11 omits a part of members for an explanation's sake.

The top housing 41 provides a groove 41j extending longitudinally in the side of the top housing 41. Although not shown in figures, the bottom housing 42 also provides a groove corresponding to the groove 41j in the top housing 41. The actuator 35 of the present embodiment has a block shape with two outer surfaces, 35a and 35b, protruding from the window 11e of the top housing 11. Inserting the optical transceiver 30 into the host system 2 and touching the surface 35b to the rail 5, the actuator 35 retreats within the pocket 11g because the surface 35b is slant with respect to the longitudinal direction, which makes the insertion of the optical transceiver 30 smooth. The actuator 35 provides a step 35i extending vertically in the front and rear edges thereof, and a guide 35j piercing from the front to the rear surface to receive the end 16a of the fastening screw 16. The end 16a, or the fastening screw 16, is longitudinally movable in the guide 35j.

The holder 37 has a similar shape with the aforementioned holder 17, that is, the holder 37 provides a pocket 37a behind the front wall to receive the actuator 35 therein. The pocket 37a sets the leaf spring 31 in the deep inside thereof so as to push the actuator 35 outward. The holder 37 further provides a rib 37g mated with the step 35i of the actuator 35 to prevent the actuator 35 from slipping out from the pocket 37a of the holder. Also, referring to FIG. 12, the holder 37 provides a band 37h in the top and bottom surfaces thereof. The bands 37h are to be set within respective grooves in the pockets of the top and bottom housings, 41 and 42, which enables the holder 37 to move only front and back within the pocket 11g of the top and bottom housings, 41 and 42.

Referring to FIGS. 13A and 13B, when the optical transceiver 30 is secured in the host system 2, pushing the fastening screw 16 rearward as compressing the coil spring 20, then, rotating the knob 16c to engage the thread 16b with the screw hole 37e. Further rotating the knob 16c, the holder 37 moves forward by the engagement of the thread 16b with the screw hole 37e, which also moves the actuator 35 forward to abut the side surface 35a thereof against the tapered surface 5d of the rail 5. Thus, the actuator 35 is tightly secured by the rail 5 and the optical transceiver 30 is securely plugged with the host system 2. Further rotating the knob 16c, the optical transceiver 30 is pushed rearward to engage the electrical plug 14 with the host connector 6.

For the disengagement of the optical transceiver 30 from the host system 2, rotating the knob 16c reversely, the engagement between the electrical plug 14 with the host connector 6 is first released, then the fastening screw 16 moves forward but the holder 37 with the actuator 35 moves rearward to detach the slant surface 35a from the tapered surface 5d of the rail 5. Further rotating the knob 16 reversely, the thread 16c is released from the screw hole 37e, the fastening screw 16 is popped frontward, which easily indicates that the optical transceiver 30 is released from the rail 5, or the host system 2.

Third Embodiment

Figure 14:
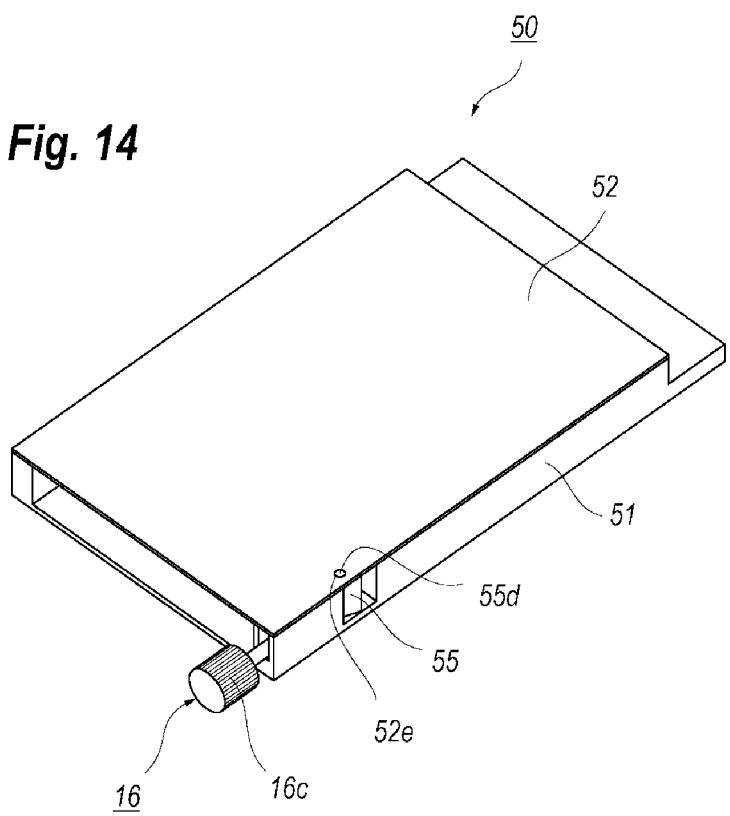
FIG. 14 is a perspective view of a CFP transceiver according to the third embodiment of the present application.
Figure 15:
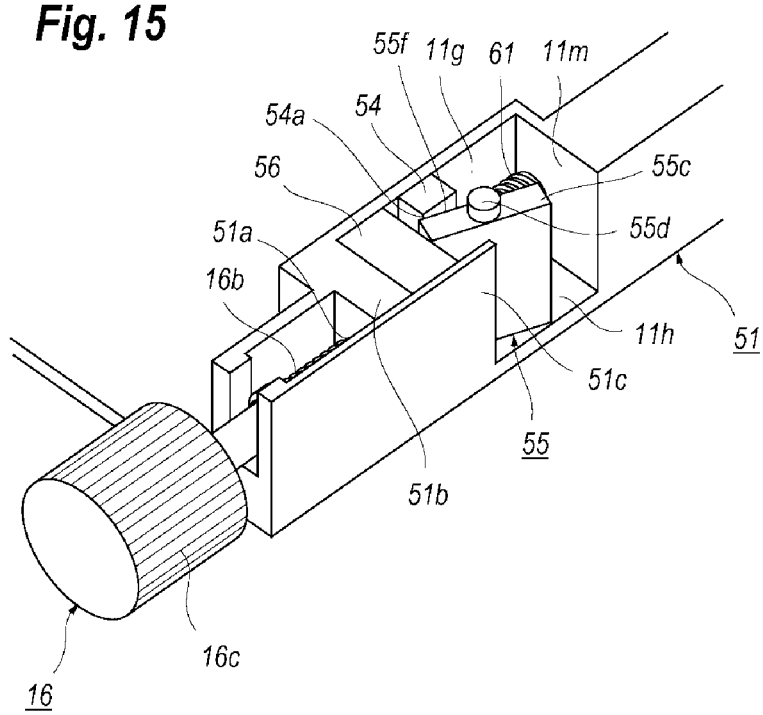
FIG. 15 magnifies a portion of the pocket of the top housing where the fastening screw and the actuator of the third embodiment are set therein.

FIG. 14 is a perspective view of a CFP transceiver 50 according to the third embodiment of the present application, and FIG. 15 magnifies a portion of the pocket 11g of the top housing 51 where the fastening screw 16 and the actuator 55 are set therein. The optical transceiver 50 of the third embodiment provides the top housing 51 that includes an spring 61, a screw hole 51a, the actuator 55 with a slab shape, a pusher 54 set in front of the spring 61, and a block 56 set between the actuator 55 and the end 16a of the fastening tool 16.

Referring to FIG. 15, the top housing 51 provides a wall 51b that partitions the pocket 11g from the guide 11c. The wall 51b provides the screw hole 51a so as to pierce the wall 51b. The end 16a of the fastening screw 16 passes through the screw hole 51a and abuts against the block 56 set behind the wall 51b. The top housing 51 also provides a side wall 51c to partition the pocket 11g from the outside.

The pocket 11g sets the spring 61, the actuator 53, the pusher 54, and the block 56 therein. The spring 61 in the rear end thereof is supported by the rear wall 11m of the pocket 11g, while, the front end of the spring 61 is supported by the pusher 54. Thus, the spring 61 pushes the pusher 54 forward. The spring 61 may be a coil spring. The pusher 54, which may be a rectangular block, is movable in front and rear in the pocket 11g. The front surface 54a of the pusher 54, exactly, one of the front edges of the front surface 54a closer to the actuator 55, may be in contact to a surface 55f of the actuator 55.

The actuator 55 provides a cylindrical projection protruding from a top thereof and another cylindrical projection 55d protruding from a bottom surface 55c thereof, where two cylindrical projections have a common axis. The bottom housing 52 provides a hole 52 to receive the bottom cylindrical projection 55d of the actuator 55. Thus, the top and bottom housings, 51 and 52, may rotatably secure the actuator 55 by the cylindrical axes 55d as the center of the rotation. One of sides of the actuator 55 is in contact to the block 56. The block 56, which is also a rectangular block, is movable in front and rear in the pocket 11g. Because the front surface of the block 56 is in contact to the end 16a of the fastening screw 16, the block 56 slides rearward as screwing the fastening screw 16 on the screw hole 51a.

Figure 16A:
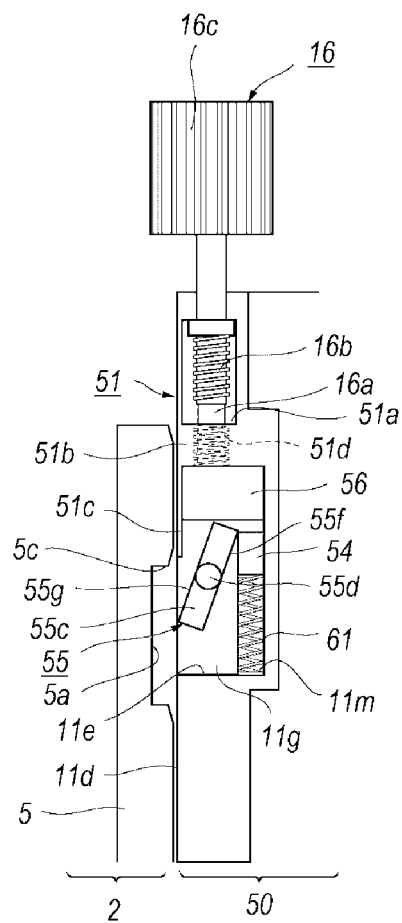
FIGS. 16A and 16B show a mechanism to engage the optical transceiver 50 with the rail 5 of the host system 2 according to the third embodiment, where
Figure 16B:
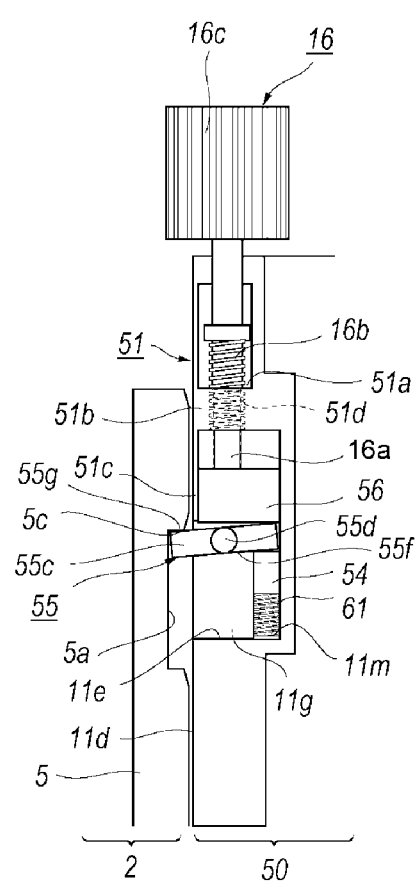

FIGS. 16A and 16B show a mechanism to engage the optical transceiver 50 with the rail 5 of the host system 2 according to the third embodiment, where FIG. 16A shows a status before the engagement and FIG. 16B shows another status after the engagement. As shown in FIGS. 16A and 16B, rotating the knob 16c, the fastening screw 16 in the thread 16b thereof engages with the screw hole 51d. Further rotating the knob 16c, the end 16a is in contact to the block 56, the block 56 is in contact to the actuator 55 to rotate the actuator around the axis 55d thereof, and the pusher 54 is pushed rearward by the actuator 55. At the same time, the side of the actuator 55 opposite to the side pushing the pusher 54 protrudes from the side 11d of the housing and the surface 55g comes in contact to the front stopper 5c of the hollow 5a of the rail 5. Thus, the optical transceiver 50 is securely engaged with the host system 2 by latching the surface 55g of the actuator 55 with the front stopper 5c of the rail 5.

Rotating the knob 16c reversely to slide the fastening screw frontward, the pusher 54 pushes the surface 55f of the actuator 55 forward by the repulsive force of the spring 61, which rotates the actuator 55 counted clockwise in FIG. 16B to release the surface 55g from the front stopper 5c. The actuator 55 in the side protruding from the side 11d of the top housing 51 retreats therefrom to release the optical transceiver 50 from the rail 5. Further rotating the knob 16c, the engagement of the thread 16b with the screw hole 51a may be released and the fastening screw 16 may be pushed out from the front of the top housing 51 by the repulsive force of the spring 61 transmitted through the pusher 54, the actuator 55, and the block 56.

The actuator 55 of the third embodiment fully retreats from the window 11e of the top housing 11 at the initial position, that is, the optical transceiver 50 is free from the host system 2. Accordingly, the insertion of the optical transceiver 50 into the rail 5 is not interfered at all.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

We claim:

1. A pluggable optical transceiver to be engaged with a rail prepared in a host system, comprising:
   a housing for enclosing optical and electrical components therein, the housing providing a front panel;
   a fastening screw passing through the front panel of the housing, the fastening screw engaging the pluggable optical transceiver with the rail; and
   an actuator protruding from a side of the housing extending perpendicular to the front panel of the housing, where the actuator is latched with the rail of the host system synchronous with a rotation of the fastening screw.

2. The pluggable optical transceiver of claim 1,
   further comprising a holder that receives the actuator therein,
   wherein the holder provides a screw hole to be engaged with a thread of the fastening screw and moves toward the front panel of the housing, the actuator protruding from the side of the housing synchronous with the movement of the holder toward the front panel.

3. The pluggable optical transceiver of claim 2,
   wherein the actuator provides a projection, a holder provides a guide extending along a lateral direction of the housing, and the housing provides a groove extending along a diagonal direction of the housing, the projection of the actuator passing the guide of the holder and being received in the groove of the housing,
   wherein the actuator protrudes from the side of the housing by sliding the projection in the groove of the housing.

4. The pluggable optical transceiver of claim 1,
   further comprising a holder that receives the actuator therein and a leaf spring set in the holder, the spring pushing the actuator outward,
   wherein the holder provides a screw hole to receive a thread of the fastening screw and moves toward the front panel of the housing by screwing the thread on the screw hole.

5. The pluggable optical transceiver of claim 1,
further comprising a block that abuts against an end of the fastening screw,
wherein the block forces the actuator to rotate around an axis by pushing an end of the actuator, the actuator in another end thereof with respect to the axis protruding from the side of the housing by the rotation thereof.

6. The pluggable optical transceiver of claim 1,
wherein the fastening screw provides a coil spring and the housing provides a guide with a front stopper, the coil spring being set within the guide and pushing the fastening screw outward by abutting the front stopper of the guide.

7. The pluggable optical transceiver of claim 1,
wherein the rotation of the fastening screw engages an electrical plug with a host connector continuous to the rail, the electrical plug being provided in a rear end of the pluggable optical transceiver opposite to the front panel.

8. The pluggable optical transceiver of claim 1,
wherein the fastening screw is terminated in a midway of the housing.

9. The pluggable optical transceiver of claim 8,
wherein the fastening screw is not protruded from a rear end of the housing.

* * * * *